Patented May 31, 1938

2,119,077

UNITED STATES PATENT OFFICE 2,119,077

NAPHTHALENE DERIVATIVES CONTAINING A CnH2nN GROUP AND PROCESS OF PRODUCING THEM

Arthur J. Hill, New Haven, Conn., and Merritt C. Fernald, New York, N. Y., assignors to Ostro Research Laboratories, Inc., New York, N. Y., a corporation of New Jersey No Drawing. Application November 24, 1933, Serial No. 699,562

10 Claims. (Cl. 260—127)

By this invention new compounds of the general formula

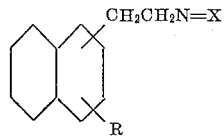

(where X=dialkyl, pentamethylene; R is hydrogen, hydroxyl or alkoxy) may be produced from the three well known brominated naphthalene derivatives, 1-bromo-naphthalene, 1-ethoxy-4-bromo-naphthalene, and 2-ethoxy-1-bromo-naphthalene.

The bases or compounds which are produced from the naphthalene derivatives in accordance with this invention are yellow to light brown oils with a characteristic amine odor. These compounds not only in themselves are valuable as local anesthetics, but other new compounds which are valuable as local anesthetics can be obtained from these compounds. These latter will be described later.

The general method of preparation of the bases or compounds consists in making the Grignard reagent from the known bromides, forming the ethyl alcohol derivative from them, converting the alcohol to the ethyl bromide derivative, and subsequently condensing the ethyl bromide derivative with the appropriate amino compound. The alcohol may be converted either to the ethyl chloride or the ethyl iodide derivative instead of the ethyl bromide derivative. We prefer, however, to convert the alcohol to the ethyl bromide derivative because of the ease of the reaction, the reactivity of the resulting bromide as compared to the ethyl chloride derivative, and the relative cheapness as compared to the ethyl iodide derivative. All the intermediate products appear to be new except 1-[β-hydroxy-ethyl]-naphthalene which is already known. A schematic representation of the general method of producing the compounds is:

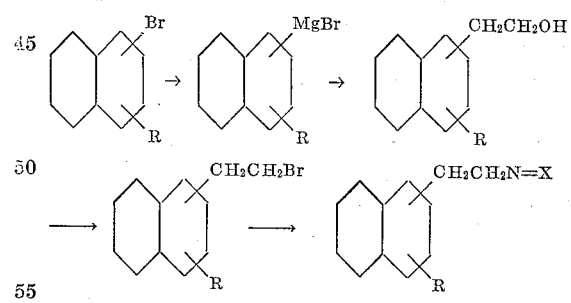

The following are given as specific examples of producing the compounds, but it is to be understood that the invention is not limited to the specific details given in the examples:

Example 1.—Preparation of 1-ethoxy-4-[β-diethyl-amino-ethyl]-naphthalene

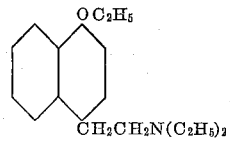

(a) 1-ethoxy-4-[β-hydroxy-ethyl]-naphthalene was prepared as follows: 100 cc. of dry ether were placed in a 500 cc. three-neck flask, which was fitted with a reflux condenser carrying a calcium chloride tube, a dropping funnel, and a mechanical stirrer; 5 grams of magnesium powder were then added to the ether, after having been activated by Baeyer's well known method; about 5-10 cc. of freshly prepared methyl-magnesium-iodide and a few crystals of iodine were then added to the mixture in the flask, after the ether had been brought to a boil; 50 gms. of 1-ethoxy-4-bromo-naphthalene in 50 cc. of dry ether were then run in slowly through the dropping funnel. The reaction started when about half of the bromide had been added and proceeded vigorously. The heating was continued for 18 hours. The flask was then cooled and 20 grams of ethylene oxide (100% excess) dissolved in 50 cc. of cool dry ether were run in slowly and cautiously while stirring vigorously. The reaction mixture was then warmed on a water bath at about 50-60° C. for one hour. The addition product was then decomposed by the addition of water followed by dilute sulfuric acid. The ether layer was separated, dried over sodium sulfate, and the alcohol (which was a viscous yellow liquid) was purified by distillation. The fraction boiling at 165°-185°/1mm. was collected. The yield averaged 50%. This alcohol may also be crystallized from petroleum ether in white plates which melt at 84° C. The alcohol is difficultly soluble in water, but is very soluble in alcohol, acetone, ether, and benzene. The picrate of the alcohol exists as brick-red needles which melt at 110°-111° C.

Analysis of picrate: the theoretical amount of nitrogen in $C_{20}H_{19}O_9N_3$ is 9.44%. The amount of N found in the product was 9.00%.

(b) 1-ethoxy-4-[β-bromo-ethyl]-naphthalene was prepared as follows: 50 grams of the 1-ethoxy-4-[β-hydroxyethyl]-naphthalene (3 mols) together with 150 cc. of dry benzene were treated with 56 grams of phosphorous tribromide (2⅓ mols) in the cold. After the addition had been made the contents of the flask were refluxed on a water bath for 6–8 hours. The contents were then cooled and ice water was added cautiously to decompose the excess phosphorous tri-bromide. The benzene layer was separated, washed first with dilute sodium carbonate, then with water, and was finally dried over sodium sulfate. The product was distilled in vacuo and the fraction boiling at 160°–175°/1 mm. was collected. It was a heavy, yellow oil which solidified on standing. The yield averaged 70%.

The bromide calculated for $C_{14}H_{17}O$ Br is 28.47% and the amount found in the product was 28.95%.

(c) 1-ethoxy-4-[β-diethyl-amino-ethyl]-naphthalene was prepared as follows: 20 grams of the 1-ethoxy-4-[β-bromo-ethyl]-naphthalene (1 mol.) were placed in a Carius tube together with 21 cc. of diethyl-amine (3 mols); the tube was sealed, and the mixture was heated at 100° C. for 5 hours. Upon cooling the contents of the tube were washed out with hydrochloric acid and water. The strongly acid solution was then extracted with ether in order to remove any unchanged bromide. The solution was then made strongly alkaline and extracted with ether. The extracts from the alkaline solution were dried over sodium sulfate. The amine distilled over as a light brown to yellow oil at 165°–170°/1½ mm. The yield was 67%.

The nitrogen calculated for $C_{18}H_{25}ON$ is 5.167% and the amount found in the product was 5.17%.

(d) The hydrochloride of 1-ethoxy-4-[β-diethyl amino-ethyl]-naphthalene was prepared by dissolving the free base in dry ether and dry hydrogen chloride was run in. A white precipitate was formed which was filtered off, washed with ether, and then recrystallized from acetone as white needles. The hydrochloride thus formed was readily soluble in water and melted at 198°–199° C.

The nitrogen calculated for $C_{18}H_{26}ONCl$ is 4.56% and the amount found in the hydrochloride was 4.30%.

*Example 2—Preparation of 2-ethoxy-1-[β-diethylamino-ethyl]-naphthalene*

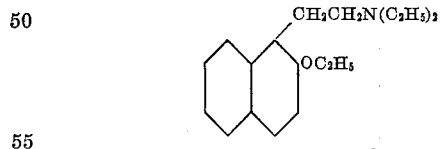

Starting with 2-ethoxy-1-bromo-naphthalene the same sort of reactions were carried out as those described above and the procedure was the same even as to the amounts of materials used.

*Example 3—Preparation of 1-[β-diethylamino-ethyl]-naphthalene*

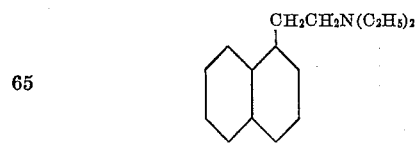

Starting with 1-bromo-naphthalene the same sort of reactions were carried out as those described above and the procedure was the same except as to the amounts of some of the materials that were used.

a. For 50 grams of the bromo derivative 6 grams of magnesium powder were used instead of 5 gms.

b. For 50 gms. of the 1-[β-hydroxy-ethyl]-naphthalene 60.3 gms. of phosphorous tribromide were used.

c. For 20 gms. of 1-[β-bromo-ethyl]-naphthalene 26.2 cc. diethyl amine were used.

The following compounds are among those that can be obtained in accordance with this invention by following the procedures described in the preceding examples. It will be understood from the above description what brominated naphthalene derivatives are to be used for the production of the respective compounds.

(1) 1-[β-diethylamino-ethyl]-naphthalene

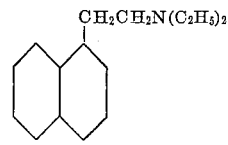

The theoretical amount of nitrogen in $C_{16}H_{21}N$ is 6.17%. The amount of nitrogen found in a sample produced by this invention was 6.14%. The boiling point was 182°–186° C. at 21 mm. The melting point of the hydrochloride of this compound was 160°–161° C.

(2) 1-[β-dibutylamino-ethyl]-naphthalene

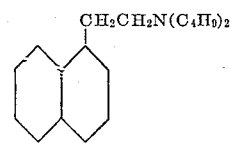

Calculated for $C_{20}H_{29}N$
Nitrogen, Theoretical_____ 4.95%
Nitrogen, Found_____ 4.92%
B. P._____ 200°–207° C./12 mm.
M. P. of the Hydrochloride_____ 90° C.

(3) 1-[β-diamylamino-ethyl]-naphthalene

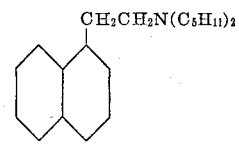

Calculated for $C_{22}H_{33}N$
Nitrogen, Theoretical_____ 4.50%
Nitrogen, Found_____ 4.48%
B. P._____ 212°–218°/12 mm.
Hydrochloride_____ oily (4) 1-ethoxy-4-[β-diethyl-amino-ethyl]-naphthalene

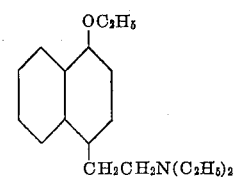

Calculated for $C_{18}H_{25}ON$
Nitrogen, Theoretical_____ 5.167%
Nitrogen, Found_____ 5.15%
B. P._____ 165°–170°/1½ mm.
M. P. Hydrochloride_____ 198°–199°

(5) 1-ethoxy-4-[β-diamyl-amino ethyl]-naphthalene

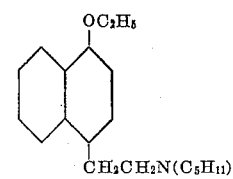

Calculated for $C_{26}H_{37}ON$
Nitrogen, Theoretical_____ 3.57%
Nitrogen, Found_____ 3.35%
B. P._____ did not distill
M. P. Hydrochloride_____ 137°–140° C.

(6) *1-ethoxy-4-[β-piperidyl-ethyl]-naphthalene*

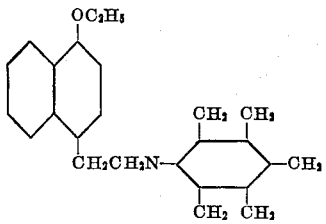

Calculated for C₁₉H₂₇ON
Carbon, Theoretical _____ 80.56%
Carbon, Found _____ 80.43%
Nitrogen, Theoretical _____ 4.95%
Nitrogen, Found _____ 4.15%
B. P. _____ 180°-190°/½ mm.
M. P. Hydrochloride _____ 249°-250°

(7) *2-ethoxy-1-[β-diethyl-amino-ethyl]-naphthalene*

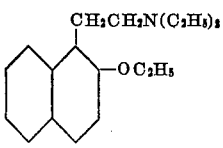

Calculated for C₁₆H₂₅ON
Nitrogen, Theoretical _____ 5.167%
Nitrogen, Found _____ 5.17%
B. P. _____ 160°-168°/2 mm.
M. P. Hydrochloride _____ 125°-126°

(8) *2-ethoxy-4-[β-dibutylamino-ethyl]-naphthalene*

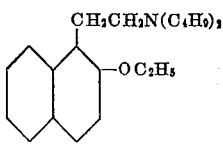

Calculated for C₂₂H₃₃ON
Nitrogen, Theoretical _____ 4.28%
Nitrogen, Found _____ 4.26%
B. P. _____ 200°-218°/8 mm.
M. P. Hydrochloride _____ 147°-148°

(9) *2-ethoxy-1-[β-diamylamino-ethyl]-naphthalene*

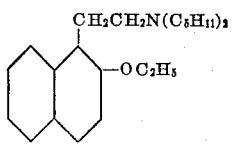

Calculated for C₂₄H₃₇ON
Nitrogen, Theoretical _____ 3.9%
Nitrogen, Found _____ 3.7%
B. P. _____ 2.10°-220°/4 mm.
M. P. Hydrochloride _____ 164°-166°

(10) *1-methoxy-4-[β-diethyl-amino-ethyl]-naphthalene*

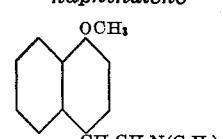

Calculated for C₁₇H₂₃ON
Nitrogen, Theoretical _____ 5.45%
Nitrogen, Found _____ 5.67%
B. P. _____ 199°-204° C./12 mm.
M. P. Hydrochloride _____ 195°-197° C.

(11) *1-ethoxy-4-[β-dimethyl-amino-ethyl]-naphthalene*

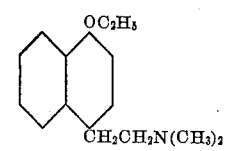

Calculated for C₁₆H₂₁ON
Nitrogen, Theoretical _____ 5.77%
Nitrogen, Found _____ 5.98%
B. P. _____ 165°-170° C./5 mm.
M. P. Hydrochloride _____ 224°-226° C.

(12) *1-ethoxy-4-[β-dibutyl-amino-ethyl]-naphthalene*

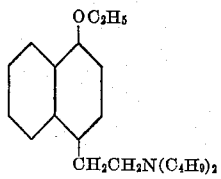

Calculated for C₂₂H₃₃ON
Nitrogen, Theoretical _____ 4.28%
Nitrogen, Found _____ 3.8%
B. P. _____ 185°-193° C./3 mm.
M. P. Hydrochloride _____ 158°-160° C.

New compounds also possessing anesthetic properties which are derived from the above may be represented by the general formula

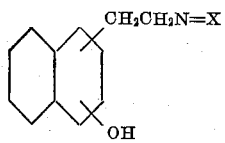

(where X is dialkyl, pentamethylene).

*Example A.*—Preparation of *2-hydroxy-1-[β-diethylamino-ethyl]-naphthalene*

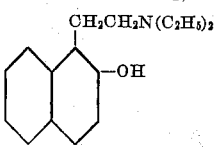

One mole of 2-ethoxy-1-[β-diethylamino-ethyl]-naphthalene was heated in a sealed tube for four hours with three moles of dry hydrogen bromide dissolved in glacial acetic acid. After cooling, the contents of the tube were poured into a distilling bulb, and the acetic acid and excess hydrogen bromide were removed under diminished pressure. The residue was transferred to a beaker and the distilling bulb was washed with concentrated hydrochloric acid. The solution was then brought almost to neutrality with sodium hydroxide, then made slightly alkaline with sodium carbonate in order to prevent sodium salt formation of the free hydroxyl compound. The solution was then extracted with ether, and the extract was dried over sodium sulfate.

The amine distilled in vacuo as an extremely viscous, yellow oil at 190°-200°/6 mm. The yield was 65%.

The nitrogen calculated for C₁₆H₂₁ON was 5.76% and the amount found in the product was 5.74%.

The hydrochloride of the base is a white crystalline solid melting at 161°-162° C.

*Example B.*—Preparation of *1-hydroxy-4-[β-diethyl-amino-ethyl]-naphthalene*

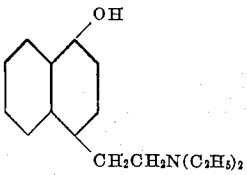

Starting with 1-ethoxy-4-[β-diethylamino-ethyl]-naphthalene the same reaction was carried out as described in connection with Example A and the procedure was the same even as to the amounts of materials used.

The hydrochloride of the base is a white crystalline material melting at 188°-189° C.

The nitrogen calculated for C₁₆H₂₂ONCl is 5.00% and the amount found in the product was 5.00%.

The compounds described above are very useful as local anesthetics and can be either injected under the skin or used for anesthetizing mucous membranes. They may be used instead of novocain for injection in the form of an 0.2% aqueous solution of the hydrochloride either with or without the addition of adrenalin. A solution of 1 to 2% has been found to be satisfactory for anesthetizing mucous membranes. These compounds have a relatively low toxicity as compared with cocaine. They also have low toxicity as compared with novocain when the small quantity required compared to the quantity of novocain that is required for the same effect is taken into consideration.

We claim:

1. A compound having the structural formula

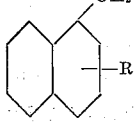

(in which X is a member of the group consisting of dialkyl and pentamethylene and R is a member of the group consisting of hydrogen, hydroxyl and an alkoxy group).

2. A compound having the structural formula

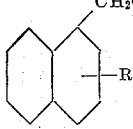

(where X is a dialkyl and R is a member of the group consisting of hydrogen, hydroxyl and an alkoxy group).

3. A compound having the structural formula

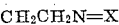
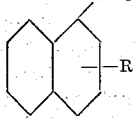

(where X is diethyl and R is a member of the group consisting of hydrogen, hydroxyl and an alkoxy group).

4. A compound having the structural formula

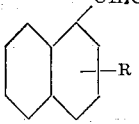

(where X is a member in the group consisting of dialkyl and pentamethylene and R is an ethoxy group).

5. The process of producing a compound having the structural formula

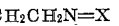
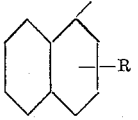

(where X is a member of the group consisting of dialkyl and pentamethylene and R is a member of the group consisting of hydrogen and an ethoxy group) from a compound of the group consisting of 1-bromo-naphthalene, 1-ethoxy-4-bromo-naphthalene and 2-ethoxy-1-bromo-naphthalene, by subjecting such brominated compound to the Grignard reaction, substituting an ethylol radical for the magnesium halide obtained by the Grignard reaction, replacing the OH of the ethylol radical with a halide and then replacing the halide with the N=X group.

6. The process of producing a compound having the structural formula

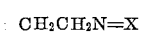
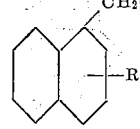

(where X is a member of the group consisting of dialkyl and pentamethylene and R is a member of the group consisting of hydrogen and an ethoxy group) from a compound of the group consisting of 1-bromo-naphthalene, 1-ethoxy-4 bromo-naphthalene and 2-ethoxy-1-bromo-naphthalene, by subjecting such brominated compound to the Grignard reaction, substituting an ethylol radical for the magnesium halide obtained by the Grignard reaction, replacing the OH of the ethylol radical with a halide and then replacing the halide with a dialkyl amino group.

7. The process of producing a compound having the structural formula

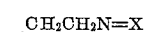
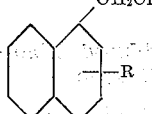

(where X is a member of the group consisting of dialkyl and pentamethylene and R is a member of the group consisting of hydrogen or an ethoxy group) from a compound of the group consisting of 1-bromo-naphthalene, 1-ethoxy-4-bromo-naphthalene and 2-ethoxy-1-bromo-naphthalene, by subjecting such brominated compound to the Grignard reaction, substituting an ethylol radical for the magnesium halide obtained by the Grignard reaction by utilizing ethylene oxide and decomposing the addition product with water, replacing the OH of the ethylol radical with a halide and then replacing the halide with a dialkyl amino group.

8. The process of producing a compound having the structural formula

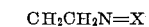
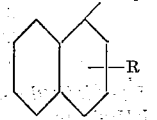

(in which X is a member of the group consisting of dialkyl and pentamethylene and R is a member of the group consisting of hydrogen or an ethoxy group) from a compound of the group consisting of 1-bromo-naphthalene, 1-ethoxy-4-bromo-naphthalene and 2-ethoxy-1-bromo-naphthalene, by subjecting such brominated compound to the Grignard reaction, substituting an ethylol radical for the magnesium halide obtained by the Grignard reaction, replacing the OH of the ethylol radical with a halide by treating with phosphorous tribromide and then replacing the halide with a dialkyl amino group.

9. The process of producing a compound having the structural formula

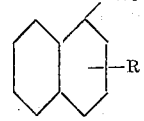

(where X is a member of the group consisting of dialkyl and pentamethylene and R is a member of the group consisting of hydrogen or an ethoxy group) from a compound of the group consisting of 1-bromo-naphthalene, 1-ethoxy-4-bromo-naphthalene and 2-ethoxy-1-bromo-naphthalene, by subjecting such brominated compound to the Grignard reaction, substituting an ethylol radical for the magnesium halide obtained by the Grignard reaction, replacing the OH of the ethylol radical with a halide and then replacing the halide by treating with the corresponding substituted amine.

10. A compound having the structural formula

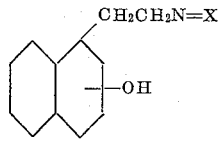

(where X is a member of the group consisting of dialkyl and pentamethylene).

ARTHUR J. HILL.
MERRITT C. FERNALD.